United States Patent [19]

Perry et al.

[11] Patent Number: 5,701,211
[45] Date of Patent: Dec. 23, 1997

[54] VEHICLE MIRROR ADJUSTMENT GEAR TRAIN

[75] Inventors: William Perry, Palestine; Kerry Helmer, Hollandsburg, both of Ohio

[73] Assignee: United Technologies Automotive Systems, Inc., Detroit, Mich.

[21] Appl. No.: 415,042

[22] Filed: Mar. 31, 1995

[51] Int. Cl.⁶ .............................. G02B 7/182; H02K 7/10
[52] U.S. Cl. .................. 359/873; 359/874; 359/876; 359/877; 74/89.17; 74/422; 192/20; 192/56.1; 310/78; 310/99
[58] Field of Search .................... 359/872, 873, 359/874, 876, 877; 192/20, 56.1; 74/89.17, 422; 310/12, 76, 78, 83, 92, 99

[56] References Cited

U.S. PATENT DOCUMENTS

| | | | |
|---|---|---|---|
| 1,925,943 | 9/1933 | Stein | 74/7 |
| 2,858,037 | 1/1958 | Hindemarch | 74/785 |
| 3,028,513 | 4/1962 | Sundt | 310/83 |
| 3,295,394 | 1/1967 | Whateley | 74/781 |
| 3,370,220 | 2/1968 | Douglass et al. | 322/40 |
| 3,552,836 | 1/1971 | Oskam | 350/289 |
| 3,609,014 | 9/1971 | Kurz, Jr. | 359/874 |
| 3,915,034 | 10/1975 | Ward | 74/740 |
| 4,080,049 | 3/1978 | Oskam et al. | 350/289 |
| 4,101,206 | 7/1978 | Oskam et al. | 250/289 |
| 4,114,988 | 9/1978 | Enomoto | 350/289 |
| 4,158,483 | 6/1979 | Fisher et al. | 350/289 |
| 4,281,899 | 8/1981 | Oskam | 350/289 |
| 4,482,211 | 11/1984 | Fisher | 359/877 |
| 4,506,954 | 3/1985 | Enomoto | 350/634 |
| 4,528,470 | 7/1985 | Young et al. | 310/78 |
| 4,555,166 | 11/1985 | Enomoto | 350/634 |
| 4,670,679 | 6/1987 | Koot et al. | 310/99 |
| 4,693,571 | 9/1987 | Kimura et al. | 350/634 |
| 4,824,232 | 4/1989 | Thompson | 359/873 |
| 4,830,327 | 5/1989 | Fimeri | 248/481 |
| 4,833,376 | 5/1989 | Shimura | 318/286 |
| 4,856,885 | 8/1989 | Fimeri | 350/633 |
| 4,881,418 | 11/1989 | Fimeri | 74/89.14 |
| 4,895,337 | 1/1990 | Oskam et al. | 248/487 |
| 4,915,493 | 4/1990 | Fisher et al. | 359/877 |
| 4,930,370 | 6/1990 | Yoshida | 74/502.1 |
| 4,940,321 | 7/1990 | Yoshida | 350/633 |
| 4,981,279 | 1/1991 | Andreas et al. | 248/483 |
| 5,226,034 | 7/1993 | Nagayama et al. | 359/877 |
| 5,343,333 | 8/1994 | Nagayama et al. | 358/877 |
| 5,363,246 | 11/1994 | Perry et al. | 359/874 |

FOREIGN PATENT DOCUMENTS

| | | |
|---|---|---|
| 1959154 | 11/1969 | Germany . |
| 2347231 | 4/1977 | Germany . |
| 3226435 | 7/1981 | Germany . |
| 2088561 | 6/1982 | United Kingdom . |

Primary Examiner—Ricky D. Shafer
Attorney, Agent, or Firm—Howard & Howard

[57] ABSTRACT

An improved gear train for the adjustment structure in a mirror includes a slip clutch disk connection that allows a pinion gear to rotate relative to an intermediate gear reduction. The pinion gear is engaged to rotate a rack, and the rack is connected to the mirror to adjust the position of the mirror. The rack is spring biased into engagement with the pinion, thus insuring that the two move with each other quietly and smoothly. The rack can be biased into engagement with the pinion gear, since it need not be able to slip relative to the pinion gear, as was the case in the prior art. The clutch disk allows the pinion gear to move with the rack when the mirror is manually adjusted. The inventive clutch disk is relatively simple, including a clutch drive gear rotatably journaled on a drive shaft. The drive shaft is fixed to rotate with the pinion gear. A spring biases a friction face of the clutch drive gear into engagement with the clutch disk, which also rotates with the pinion gear. Since the pinion gear may slip relative to the clutch drive gear, but will always move with the rack, a memory feedback position control can sense the rotational position of the pinion gear and provide an accurate indication of the actual position of the rack, and hence the mirror.

20 Claims, 1 Drawing Sheet

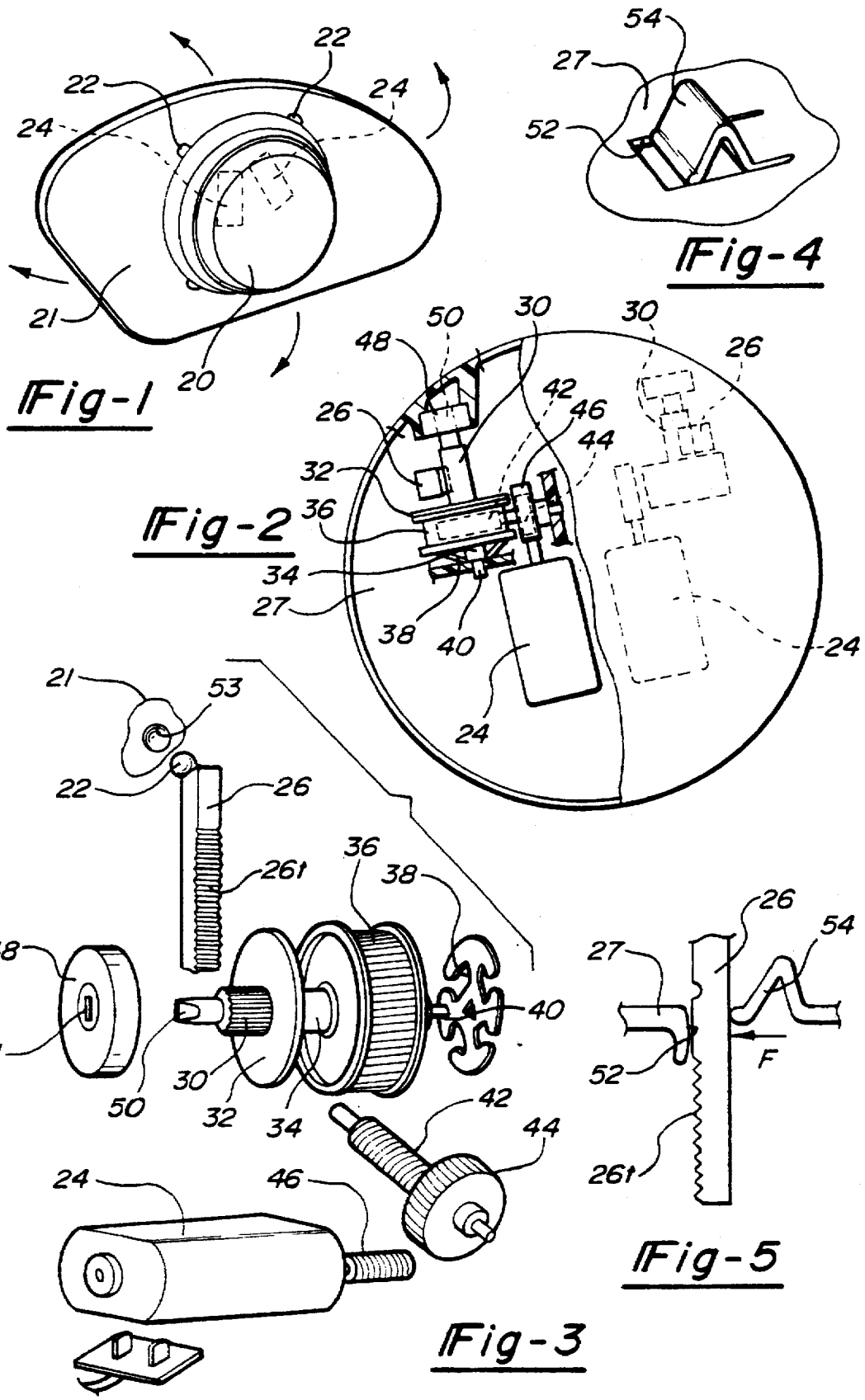

VEHICLE MIRROR ADJUSTMENT GEAR TRAIN

BACKGROUND OF THE INVENTION

This invention relates to improvements in the gear train for the adjustment structure utilized in adjustable vehicle mirrors.

Modern vehicles are provided with the ability to adjust the angular position of exterior mirror from a position within the vehicle. Typically, two adjustment members are moved by mirror positioning controls inside the vehicle cab. The two adjustment members are connected to a control, and the vehicle operator is provided with a positioning input switch to adjust the position of the mirror. A separate driving motor moves each adjustment member to move the mirror surface as required to achieve the position indicated by the operator.

In the prior art, certain problems have developed. First, while it is desirable to allow the operator to adjust the position of the mirror by the power drive, manual adjustment is still sometimes applied by the operator. That is, at times, the operator may grasp and manually move the mirror. Thus, while the power adjustment structure must be capable of accurately moving the mirror, the system must be able to accommodate manual movement of the mirror. Typically, the mirror adjustment members are allowed to ratchet relative to driving gears when manually adjusted. This produces undesirable clicking noises, and further only allows the operator to incrementally manually adjust the mirror between each gear tooth location.

Also, the above-described ratcheting to achieve manual adjustment has certain limitations in mirrors with a memory. It is a goal of modern vehicle designers to allow adjustment of many vehicle components to a memory position for each individual operator. When a particular operator enters the cab of the vehicle, it may be desirable to have the steering wheel, the seat and the mirrors all move to a pre-set position for the operator. To achieve such a memory position, it would typically be necessary for a control for the system to recognize where the mirror actually is. Manual mirror adjustment makes feedback of the actual position of the mirror difficult to monitor.

There have been suggestions in the prior art to allow the drive gear which engages and moves the adjustment member to move with the adjustment member when manually adjusted. A slip structure is disposed between the prior art drive gear and the motor. The proposed prior art systems have been overly complex. Further, the proposed prior art systems often rely upon ratcheting movement between intermediate structures to achieve the slip movement. The ratcheting movements still result in undesirable noise and do not allow infinite adjustment or smooth and easy movement.

Finally, the most desirable mirror adjustment members are rack and pinion connections. Other types of connections have drawbacks. Rack and pinion type connections, however, typically have problems with backlash. In the prior art, mechanical transmissions have often applied a bias force to the rear of a rack to hold it in contact with a pinion gear to address the backlash problem. However, in rack and pinion type mirror adjustment systems known in the prior art, manual adjustment has required that the rack member be capable of movement relative to the pinion gear. Thus, commercial systems have typically not been provided with a bias force. Such a bias force would hold the rack into such strong contact with the pinion gear that the manual adjustment would be undesirably difficult.

SUMMARY OF THE INVENTION

In a proposed embodiment of this invention, the mirror adjustment members are racks driven by pinion gears. The pinion gears are connected into a gear train which is driven by a motor. The motor is connected to a mirror position control system. The pinion gears are driven by the motor through a slip clutch disk. The clutch disk is in contact with a drive clutch gear. A spring force maintains the drive clutch gear in contact with the slip clutch disk. A face of the slip clutch disk is in frictional contact with a face of the drive clutch gear. Should there be torque on that connection beyond a predetermined amount, the two faces will rotate relative to each other. This will occur, for example, when the mirror position is manually adjusted. The slip connection is relatively simple, requiring only three parts. First, there is a combined drive shaft, pinion gear, and slip clutch disk part. Second, the drive clutch gear is received on the shaft. Third, a spring biases the drive clutch gear along the drive shaft into contact with the slip clutch disk. The clutch disk is fixed to rotate with the drive shaft and the pinion gear. The relatively simple construction insures easy operation and quiet adjustment of the mirror.

In other features of this invention, the mirror is equipped to operate in a memory system. A memory position feedback structure includes an opening which receives an extension of the shaft. This memory structure monitors rotation of the drive shaft and hence the pinion gear. The pinion gear rotates at all times with the rack, and thus the rotational position of the pinion gear provides an accurate indication of the position of the rack and mirror. Since the use of the slip clutch disk allows the manual adjustment of the rack and pinion gear relative to the driving structure, manual adjustment is also accounted for in the memory feedback. When the mirror is manually adjusted the rack adjustment member moves, and rotates the pinion gear. The rotational position of the pinion gear is sensed by the memory structure. At the same time, the pinion gear and the clutch disk rotate relative to the clutch drive gear. There is smooth relative rotation, and no noise of incremental gear teeth clicking relative to each other during the slip movement. Further infinite manual adjustment is provided; not just the incremental adjustment provided by gear teeth connections.

In other features of this invention, a spring force biases the rack into contact with the pinion gear. The rack is assured of always being in driving contact with the pinion gear. In the prior art, one could not spring bias a rack into a pinion gear, as it was necessary for the rack to move relative to the pinion gear during manual adjustment. The use of the inventive slip clutch disk allows the inclusion of a spring force holding the rack firmly in contact with the pinion gear.

In one particular embodiment, the rack extends through an opening in the cover for the motor. The opening in the cover is provided with a bias member that is biased away from a relaxed position by the rack. The bias member applies a bias force to the rack, holding it in contact with the pinion gear.

In other preferred features of this invention, a gear reduction between the motor and the clutch drive gear includes two separate worm gear connections. The worm gears provide a relatively quiet gear reduction. In the prior art, planetary transmissions were typically used. The inventive worm gear reduction operates much more quietly and smoothly than the prior art planetary transmission.

These and other features of the present invention can be best understood from the following specification and drawings, of which the following is a brief description.

DESCRIPTION OF THE DRAWINGS

FIG. 1 is a rear view of a mirror adjustment structure.

FIG. 2 is a top view of the mirror adjustment gear train.

FIG. 3 is an exploded view of a portion of the mirror adjustment structure shown in FIG. 2.

FIG. 4 is a view of a portion of a cover plate for the mirror motor.

FIG. 5 is a cross-sectional view through the cover plate.

DETAILED DESCRIPTION OF A PREFERRED EMBODIMENT

A mirror adjustment motor 20 is shown in FIG. 1 connected to a mirror 21. A pair of adjustment ears 22 are connected into an opening in the rear of the mirror 21. Controls within the cab of the vehicle allow the operator to move the position of the ears 22 to adjust the orientation of the mirror 21. Motors 24 drive the ears 22 as will be described below.

As shown in FIG. 2, adjustment members 26 are connected to the ears 22 and are driven by the motors 24 to adjust the mirror 21. The adjustment members 26 are provided with gear teeth on a first face and function as a rack in a rack and pinion connection. A cover 27 for the mirror 20 includes openings through which the rack 26 extends, as will be explained below. The racks 26 are in engagement with pinion gears 30 which are connected to be driven with a clutch disk 32. Clutch disk 32, pinion gear 30 and a drive shaft 34 are all connected as a single moving part. A clutch drive gear 36 is biased into engagement with the clutch disk 32 by a spring 38. An end mount 40 mounts the gear train at one end of the arrangement.

A drive or first worm gear 42 drives the clutch drive gear 36. A transfer gear 44 is integrally connected to worm gear 42 and is driven by a second worm gear 46. A second worm gear 46 is driven by motor 24. Now, when it is desired to rotate the pinion gear 30 to move the rack 26, a control actuates motor 24 to rotate worm gear 46. Worm gear 46 turns transfer gear 44 which in turn drives an intermediate worm gear 42. Intermediate worm gear 42 drives clutch drive gear 36, and since clutch drive gear 36 is biased into contact with clutch disk 32, clutch disk 32 also rotates. Clutch disk 32 in turn rotates pinion gear 30. Rotation of pinion gear 30 moves the rack member 26. The motor and described rotation are reversible. The clutch drive gear 36 is rotatably mounted on shaft 34, but free to move axially relative to the clutch disk 32. Thus, should the bias force of spring 38 be overcome, pinion gear 30 and clutch disk 32 may rotate relative to clutch drive gear 36. Typically this will happen when the mirror 21 is manually adjusted. Manual adjustment of the mirror would cause the rack 26 to move and drive the pinion gear 30. The pinion gear would rotate the clutch disk 32, and if the bias force of spring 38 is overcome, then the clutch disk 32 will rotate relative to the clutch drive gear 36. Since in the instance of manual adjustment worm gear 42 will not be rotating, but would be holding clutch drive gear 36 stationary, the bias force of spring 38 should be overcome.

Further, a memory position feedback member 48 receives an extension 50 from pinion gear 30 to provide feedback to a memory system of the actual position of the mirror. This is important for control systems incorporating a particular memory feature for an operator. These memory systems are becoming more widely demanded in modern vehicles.

As shown in FIG. 3, the clutch drive gear 36 is freely movable on shaft 34. Extension finger 50 extends into a slot 51 in the memory position number 48. Memory position number 48 may be any type of known transducer that would be capable of sensing rotation of the finger 50, and hence the pinion gear 30. To facilitate this function, finger 50 and slot 51 are generally rectangular. Further, ears 22 are shown to be mounted within an opening 53 in the mirror 21.

As shown, the slip between the pinion 30 and the drive motor 24 is accomplished using only three relatively simple parts. A first part incorporates the pinion gear 30, the clutch disk 32 and the shaft 34. A second part is the clutch drive gear 36 which is freely slidable on shaft 34. A third part is the spring member 38. The slip function is thus provided in a relatively simple fashion, and yet is also provided in such a way that incremental ratcheting would not occur. Thus, the manual adjustment can be an infinite adjustment, and also will be relatively smooth and quiet when compared to the prior art ratcheting slip systems.

As shown in FIG. 4, cover 27 incorporates an opening 52 including a spring member 54 integrally formed with cover 27. Cover 27 can be molded as a one-piece item, and a worker of ordinary skill in the plastic molding art would be aware of how to form such a part.

As shown in FIG. 5, the cover 27 has adjustment member 26 extending through opening 52. Ear 22 is at a location outwardly of cover 27. Spring member 54 is biased away from its relaxed position when the adjustment member 26 extends through opening 52. Thus, a bias force F is placed against the rear face of adjustment member 26. The front face of adjustment member 26 which includes the rack teeth 26t is thus biased into engagement with the pinion gear. Since the inventive gear train system allows relative movement between the pinion gear and the motor, and since the memory function demands that the pinion gear position be always associated with the actual position of the rack 26, this spring force F provides valuable benefits. Moreover, the problem of backlash as is often found in a rack and pinion gear train is overcome by this combination.

A preferred embodiment of this invention has been disclosed, however, a worker of ordinary skill in the art would recognize that certain modifications would come within the scope of this invention. For that reason, the following claims should be studied to determine the true scope and content of this invention.

We claim:

1. A mirror adjustment system comprising:
   a pair of adjustment members, each including a surface formed with gear teeth extending along one face, such that said adjustment members each function as a rack;
   a gear train for each of said adjustment members, comprising:
   a pinion gear engaged with said teeth of said adjustment member, said pinion gear being connected to be driven by a motor to move said adjustment member;
   a clutch drive gear adapted to be rotated by said motor, said clutch drive gear including a friction face engaged with a clutch disk, said clutch disk being fixed to rotate with said pinion gear; and
   a bias force holding said clutch drive gear friction face in contact with said clutch disk such that upon rotation of said clutch drive gear by said motor, said clutch disk and said pinion gear are driven to rotate, but when resistance to rotation overcomes said bias force, one of said clutch drive gear and said clutch disk can rotate relative to the other.

2. A system as recited in claim 1, wherein a memory function is incorporated into the system, and said memory function includes a memory position feedback member sensing the rotational position of said pinion gear.

3. A system as recited in claim 2, wherein said pinion gear includes a finger extension extending from said pinion gear away from said clutch drive gear, and received within a slot in said memory position feedback member, rotation of said pinion gear being sensed by said memory position feedback member through said finger.

4. A system as recited in claim 2, wherein said adjustment member gear-teeth are spring biased into engagement with said pinion gear.

5. A system as recited in claim 1, wherein said adjustment member gear-teeth are spring biased into engagement with said pinion gear.

6. A system as recited in claim 5, wherein said spring bias is provided by a bias member in a housing cover enclosing said gear train, said adjustment member extending outwardly through said cover.

7. A system as recited in claim 1, wherein a drive worm gear drives said clutch drive gear, said drive worm gear being operably connected to be driven by said motor to rotate said clutch drive gear.

8. A system as recited in claim 7, wherein said motor drives a motor worm gear, said motor worm gear driving an intermediate gear, said intermediate gear being fixed to rotate with said drive worm gear such that the each gear train incorporates two worm gears.

9. A system as recited in claim 1, wherein said pinion gear is fixed to rotate with said clutch disk and a drive shaft, said clutch drive gear being journaled for rotation on said drive shaft but free to move axially along said drive shaft, and said bias force being provided by a spring mounted on said drive shaft on a first side of said clutch drive gear, said pinion gear and said clutch disk being mounted on a second side of said clutch drive gear.

10. An adjustment system for adjusting the position of a mirror comprising:

a pair of adjustment members, said adjustment members having gear teeth extending along a generally planer face such that each of said adjustment members functions as a rack;

each adjustment member associated with a gear train, each gear train including:

a pinion gear having gear teeth engaged with said gear teeth on said adjustment member, said pinion gear being connected to be rotated by a motor, there being a slip connection between said pinion gear and said motor such that said pinion gear can rotate relative to said motor when a bias force is overcome; and a spring bias force biasing said adjustment member gear teeth into engagement with said pinion gear.

11. A system as recited in claim 10, wherein the system is provided with a memory function, and there being a memory position feedback member sensing the position of each of said adjustment members.

12. A system as recited in claim 11, wherein said memory position feedback member includes a member sensing the rotational position of said pinion gear to provide an indication of the position of each of said adjustment members.

13. A system as recited in claim 10, wherein said adjustment members each extend through openings in a cover which houses said motor, said spring bias force being provided by a spring member mounted in said cover.

14. A system as recited in claim 13, wherein said spring bias member in integrally molded with said motor cover, and is moved away from a relaxed position by each of said adjustment members such that a spring force is provided on each of said adjustment members biasing said adjustment member into said pinion gear.

15. An mirror adjustment system comprising:

a pair of adjustment members, each adjustment member including a surface formed with gear teeth extending in a plane, such that said adjustment members each function as a rack;

each adjustment member associated with a gear train, each gear train comprising:

a pinion gear engaged with said teeth of said adjustment member, said pinion gear being connected to be rotated by a motor to move said adjustment member, a spring force biasing said adjustment member into said pinion gear;

a clutch drive gear adapted to be rotated by said motor, said clutch drive gear including a friction face engaged with a clutch disk, said dutch disk being fixed to rotate with said pinion gear; and a bias force holding said clutch drive gear friction face in contact with said clutch disk such that upon rotation of said dutch drive gear by said motor, said clutch disk and said pinion gear are driven to rotate, but when resistance to rotation overcomes said bias force, one of said clutch drive gear and said dutch disk can rotate relative to the other.

16. A system as recited in claim 15, wherein a drive worm gear is engaged with and drives said clutch drive gear, said drive worm gear being operably connected to be driven by said motor to rotate said clutch drive gear.

17. A system as recited in claim 16, wherein said motor drives a motor worm gear, said motor worm gear driving an intermediate gear, said intermediate gear being fixed to rotate with said drive worm gear such that said gear trains each incorporate two worm gear drives.

18. A system as recited in claim 15, wherein there is a memory function incorporated into the adjustment system, and said memory function includes a memory position feedback member sensing the rotational position of said pinion gear.

19. A system as recited in claim 15, wherein said pinion gear is fixed to rotate with said clutch disk and a drive shaft, said clutch drive gear being journaled for rotation on said drive shaft, but free to move axially along said drive shaft, and said bias force being provided by a spring mounted on said drive shaft.

20. A system as recited in claim 19, wherein said spring bias force is provided by a spring mounted on said drive shaft on a first side of said clutch drive gear, said pinion gear and said clutch disk being mounted on a second side of said clutch drive gear.

* * * * *